United States Patent [19]

Chazono et al.

[11] Patent Number: 4,809,131
[45] Date of Patent: Feb. 28, 1989

[54] LOW TEMPERATURE SINTERED CERAMIC CAPACITOR HAVING A HIGH RESISTIVITY AND BENDING STRENGTH, AND METHOD OF MANUFACTURE

[75] Inventors: Hirokazu Chazono, Takasaki; Minoru Oshio, Harunamachi; Shunji Murai, Takasaki; Hiroshi Kishi, Fujioka, all of Japan

[73] Assignee: Taiyo Yuden Co., Ltd., Tokyo, Japan

[21] Appl. No.: 187,741

[22] Filed: Apr. 29, 1988

[30] Foreign Application Priority Data

May 12, 1987 [JP] Japan .................. 62-115364

[51] Int. Cl.$^4$ .............. H01G 4/12; H01G 7/00; C04B 35/50
[52] U.S. Cl. .................. 361/321; 264/65; 501/134; 29/25.42
[58] Field of Search .......... 29/25.42; 264/61, 65; 501/134–138; 252/513; 361/320, 321

[56] References Cited

U.S. PATENT DOCUMENTS

| | | | |
|---|---|---|---|
| 4,607,314 | 8/1986 | Wada et al. | 264/65 X |
| 4,700,264 | 10/1987 | Kishi et al. | 361/321 |
| 4,700,265 | 10/1987 | Kishi et al. | 361/321 |
| 4,700,269 | 10/1987 | Kishi et al. | 361/321 |
| 4,709,299 | 11/1987 | Kishi et al. | 361/321 |
| 4,723,193 | 2/1988 | Chazono et al. | 501/134 X |

FOREIGN PATENT DOCUMENTS 53-98099  8/1978  Japan .

Primary Examiner—Donald A. Griffin
Attorney, Agent, or Firm—Woodcock Washburn Kurtz Mackiewicz & Norris

[57] ABSTRACT

A monolithic capacitor having a dielectric ceramic body cosintered with at least two base metal electrodes buried therein. The ceramic body is composed of a major ingredient expressed by the formula, $$(Ba_{1-v-w}Me_vMg_wO)_k(Zr_{1-x-y}Ti_xSi_y)O_2$$

where Me is either or both of strontium and calcium, and v, w, x, y and k are numerals in specified ranges. To this major ingredient is added a minor proportion of a mixture of boric oxide, silicon dioxide, and one or more metal oxides selected from among barium oxide, magnesium oxide, zinc oxide, strontium oxide and calcium oxide. For the fabrication of capacitors the mixture of the above major ingredient and additives in finely divided form are formed into moldings of desired shape and size, each with at least two electrodes buried therein. The moldings and electrodes are cosintered in a reductive or neutral atmosphere at temperatures of less than 1200° C., and then are reheated at a lower temperature in an oxidative atmosphere.

9 Claims, 2 Drawing Sheets

LOW TEMPERATURE SINTERED CERAMIC CAPACITOR HAVING A HIGH RESISTIVITY AND BENDING STRENGTH, AND METHOD OF MANUFACTURE

BACKGROUND OF THE INVENTION

Our invention relates to solid dielectric capacitors and more particularly to ceramic capacitors of the monolithic type which are capable of manufacture by cosintering of the ceramic body and the electrodes at such low temperatures as to permit use of a base metal as the electrode material. Our invention also specifically pertains to a process for the fabrication of such ceramic capacitors.

Multilayered ceramic capacitors have long been known and used extensively which employ noble metals such as platinum and palladium as the electrode materials. Generally, for the manufacture of such capacitors, there are first prepared "green" (unsintered) dielectric sheets from the proportioned ingredients of a desired dielectric ceramic material in finely divided form. An electroconductive paste containing powdered platinum or palladium is then "printed" on the green sheets in a desired pattern. A plurality of such printed green sheets are stacked up, pressed together, and sintered in a temperature range of 1300° to 1600° C. in an oxidative atmosphere.

This conventional method makes possible the simultaneous firing (cosintering) of the dielectric ceramic layers and the film electrodes interleaved therewith. It is also an acknowledged advantage of the known method that the noble metal electrodes are totally unaffected by the high temperature sintering in an oxidative atmosphere. Offsetting all these advantages is the expensiveness of the noble metals, which add considerably to the costs of the multilayered ceramic capacitors.

Japanese Laid Open Patent Application No. 53-98099 suggests a solution to the above discussed problem, teaching ceramic compositions consisting primarily of calcium zirconate ($CaZrO_3$) and manganese dioxide ($MnO_2$). In the manufacture of ceramic capacitors the dielectric bodies of these known compositions are sinterable in a reductive atmosphere, so that electrodes of nickel or like base metal can be employed for cosintering with the dielectric bodies without the danger of oxidation.

We do, however, object to the prior art $CaZrO_3$-$MnO_2$ ceramic compositions for several reasons. These known ceramic compositions require firing in as high a temperature range as from 1350° to 1380° C. When the green sheets of the ceramic compositions, having printed thereon a paste composed primarily of powdered nickel, are sintered in that temperature range, the nickel particles tend to grow and flocculate in spite of the nonoxidative atmosphere in which they are fired. We have also found that the base metal particles are easy to diffuse into the ceramic bodies when fired in that temperature range. The flocculation and diffusion of the base metal particles are, of course, both undesirable as the resulting capacitors will in all likelihood fail to possess desired values of capacitance and insulation resistance.

These weaknesses of the $CaZrO_3$-$MnO_2$ ceramic compositions have been overcome to some extent by Kishi et al. U.S. Pat. Nos. 4,700,265 and 4,709,299, both teaching dielectric ceramic compositions that permit cosintering at temperatures of not more than 1200° C. The compositions according to U.S. Pat. No. 4,700,265 consist essentially of a major ingredient expressed by the general formula, $(SrO)_k(Zr_{1-x}Ti_2)O_2$, and minor proportions of lithium oxide ($Li_2O$), silicon dioxide ($SiO_2$), and at least one metal oxide selected from among barium oxide (BaO), magnesium oxide (MgO), zinc oxide (ZnO), strontium oxide (SrO) and calcium oxide (CaO). U.S. Pat. No. 4,709,299, on the other hand, proposes compositions consisting essentially of a major ingredient expressed by the general formula, $(CaO)_k(Zr_{1-x}Ti_x)O_2$, and minor proportions of boric oxide ($B_2O_3$), $SiO_2$, and at least one metal oxide selected from among BaO, MgO, ZnO, SrO and CaO. compositions according to U.S. Pat. No. 4,700,265.

The ceramic compositions suggested by the noted U.S. patents permit cosintering of the dielectric bodies and base metal electrodes in a reductive or neutral atmosphere at temperatures not exceeding 1200° C. Little or no flocculation of the base metal, particularly nickel, takes place because of the low sintering temperatures. The resulting ceramic capacitors are particularly well suited for temperature compensating applications, having a specific dielectric constant of not less than 30, a temperature coefficient of capacitance of $-800$ to $+140$ parts per million (ppm) per degree centigrade (C.), a Q factor of not less than 2000, a resistivity of not less than $1 \times 10^7$ megohm-centimeters (megohm-cm), and a bending strength of approximately 1300 kilograms per square centimeter ($kg/cm^2$).

While these performance characteristics of the closest prior art are satisfactory for all practical purposes, we have nevertheless been hard pressed by our customers for dielectric ceramics of higher performance characteristics. For example, an improvement in resistivity will result in capacitors of greater voltage withstanding capability. An improvement in bending strength will result in less breakage of capacitors during their manufacture and mechanical mounting on circuit boards. An improvement in specific dielectric constant will result in capacitors of higher capacitance or, if the capacitance is maintained the same as heretofore, in capacitors of greater interelectrode spacing. The greater interelectrode spacing is desirable from the standpoint of less voltage per unit thickness of the ceramic body.

SUMMARY OF THE INVENTION

We have hereby invented how to improve the performance characteristics, notably the resistivity and bending strength, of the ceramic capacitors of the class under consideration without loss or diminution of the conventionally gained advantage of cosinterability at temperatures of no more than 1200° C. in a reductive or neutral atmosphere.

Briefly summarized in one aspect thereof, our invention provides a low temperature sintered solid dielectric capacitor of improved performance characteristics, comprising a dielectric ceramic body and at least two electrodes in contact therewith. The dielectric ceramic body consists essentially of: (a) 100 parts by weight of a major ingredient expressed by the general formula, $(Ba_{1-v-w}Me_vMg_wO)_k(Zr_{1-x-y}Ti_xSi_y)O_2$, where Me is at least either of strontium (Sr) and calcium (Ca), v a numeral in the range of 0.005–0.980, w a numeral in the range of 0.001–0.050, x a numeral in the range of 0.00–0.50, y a numeral in the range of 0.005–0.100, and k a numeral in the range of 0.80–1.25; and (b) from 0.2 to 10.0 parts by weight of an additive mixture of $B_2O_3$, SiO$_2$ and at least one of BaO, MgO, ZnO, SrO and CaO. The relative proportions of B$_2$O$_3$, SiO$_2$ and at least one selected metal oxide, altogether constituting the additive mixture, will be specified in conjunction with the ternary diagram attached hereto.

The ceramic capacitor of our invention, having its dielectric body formulated as set forth in the foregoing, has proved to have vary favorable performance characteristics. The test capacitors manufactured in accordance with our invention, to be disclosed in detail subsequently, had resistivities of not less than 1×10$^8$ megohm-cm, bending strengths of not less than 1500 kg/cm, specific dielectric constants of not less than 35, temperature coefficients of capacitance of −1000 to +45 ppm per degree C., and Q factors at 1 megahertz (MHz) of not less then 5000.

Another aspect of our invention concerns a method of fabricating the above outlined ceramic capacitor. The method dictates, first of all, the preparation of a mixture of the major ingredient and the additives in finely divided form. This mixture is then molded into a body of desired shape and size, which is provided with at least two electrode portions of an electroconductive material in any convenient manner. Then the molding with the electrode portions is sintered in a nonoxidative (i.e. reductive or neutral) atmosphere and is subsequently reheated in an oxidative atmosphere.

We recommend a temperature range of 1050° to 1200° C. for sintering the dielectric molding. This temperature range is sufficiently low to permit the cosintering, in a reductive or neutral atmosphere, of nickel or like base metal electrodes on the dielectric molding without the likelihood of the flocculation or diffusion of the base metal.

The above and other features and advantages of our invention and the manner of realizing them will become more apparent, and the invention itself will best be understood, from a study of the following description and appended claims taken together with the attached drawings.

DETAILED DESCRIPTION

Figure 1:
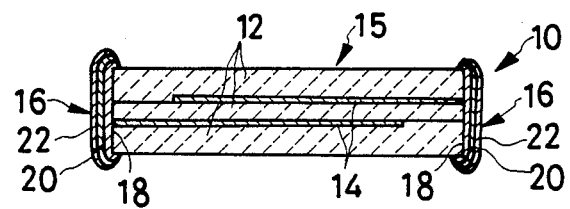
FIG. 1 is a sectional representation of a monolithic, multilayered ceramic capacitor capable of manufacture in accordance with our invention, the illustrated capacitor being representative of numerous test capacitors fabricated in the Examples of our invention to be presented subsequently.

We have illustrated in FIG. 1 one of many monolithic ceramic capacitors of like construction fabricated in the subsequent Examples of our invention by way of a preferable embodiment thereof. Generally designated 10, the respresentative capacitor is shown to have an interlamination of three dielectric ceramic layers 12 and two film electrodes 14. The three ceramic layers 12 constitute in combination a solid dielectric body 15 having the low temperature sintered ceramic compositions in accordance with our invention. The two film electrodes 14, which can be of a low cost base metal such as nickel, extend from the opposite sides of the dielectric body 15 toward, and terminate short of, the other sides of the dielectric body and so have an overlapping, parallel spaced relation to each other. A pair of conductive terminations 16 contact the respective film electrodes 14. Each termination 16 is shown to comprise a baked on zinc layer 18, a plated on copper layer 20, and a plated on solder layer 22.

Typically, and as fabricated in the subsequent Examples of our invention, the intermediate one of the three dielectric layers 12 has a thickness of 0.02 millimeter (mm). The area of that part of each film electrode 14 which overlaps the other film electrode is 25 mm$^2$ (5×5 mm).

EXAMPLES

We fabricated 98 different sets of test capacitors, each constructed as in FIG. 1, some having their dielectric bodies formulated in accordance with the ceramic compositions of our invention and others not, and measured their specific dielectric constant, temperature coefficient of capacitance, Q factor, resistivity, and bending strength. Table 1 lists the compositions of the dielectric bodies of all the test capacitors fabricated.

The major ingredient of the ceramic compositions in accordance with our invention has been herein defined as $(Ba_{1-v-w}Me_vMg_wO)_k(Zr_{1-x-y}Ti_xSi_y)O_2$, where Me is either or both of Sr and Ca. Accordingly, in Table 1, we have given various combinations of the atomic numbers k, v, w, x and y in the formula to indicate the specific major ingredients employed in the various Tests. The ceramic compositions of our invention further include mixtures, in various proportions, of additives B$_2$O$_3$, SiO$_2$ and MO. Table 1 specifies the amounts, in parts by weight, of the additive mixtures with respect to 100 parts by weight of the major ingredients, as well as the relative proportions, in mole percent, of the additives B$_2$O$_3$, SiO$_2$ and MO. Further, since MO can be any one or more of BaO, MgO, ZnO, SrO and CaO, Table 1 gives the relative proportions, in mole percent, of these metal oxides.

TABLE 1

| | Ceramic Compositions | | | | | | | | | | | | | | |
|---|---|---|---|---|---|---|---|---|---|---|---|---|---|---|---|
| | Major Ingredient (100 wt. parts) | | | | | | | Additives | | | | | | | |
| | | v | | | | | | Amount | Composition (mole %) | | | MO (mole %) | | | |
| Test No. | k | Sr | Ca | Sum | w | x | y | (wt. parts) | B$_2$O$_3$ | SiO$_2$ | MO | BaO | MgO | ZnO | SrO | CaO |
| 1 | 1.00 | 0.100 | 0.100 | 0.200 | 0.010 | 0.20 | 0.010 | 1.0 | 1 | 80 | 19 | 20 | 20 | 20 | 20 | 20 |
| 2 | " | " | " | " | " | " | " | " | 1 | 39 | 60 | " | " | " | " | " |
| 3 | " | " | " | " | " | " | " | " | 29 | 1 | 70 | " | " | " | " | " |
| 4 | " | " | " | " | " | " | " | " | 90 | 1 | 9 | " | " | " | " | " |
| 5 | " | " | " | " | " | " | " | " | " | 9 | 1 | " | " | " | " | " |
| 6 | " | " | " | " | " | " | " | " | 19 | 80 | " | " | " | " | " | " |
| 7 | " | " | " | " | " | " | " | " | 10 | 85 | 5 | " | " | " | " | " |
| 8 | " | " | " | " | " | " | " | " | 5 | 30 | 65 | " | " | " | " | " |

TABLE 1-continued

Ceramic Compositions

| Test No. | Major Ingredient (100 wt. parts) k | v Sr | Ca | Sum | w | x | y | Additives Amount (wt. parts) | Composition (mole %) B$_2$O$_3$ | SiO$_2$ | MO | MO (mole %) BaO | MgO | ZnO | SrO | CaO |
|---|---|---|---|---|---|---|---|---|---|---|---|---|---|---|---|---|
| 9  | " | " | " | " | " | " | " | " | " | 20 | 75 | " | " | " | " | " |
| 10 | " | " | " | " | " | " | " | " | 15 | 10 | 75 | " | " | " | " | " |
| 11 | " | " | " | " | " | " | " | " | 10 | 5 | 85 | " | " | " | " | " |
| 12 | " | " | " | " | " | " | " | " | 95 | 0 | 5 | " | " | " | " | " |
| 13 | " | " | " | " | " | " | " | " | 10 | 80 | 10 | " | " | " | " | " |
| 14 | " | " | " | " | " | " | " | " | 5 | 65 | 30 | " | " | " | " | " |
| 15 | " | " | " | " | " | " | " | " | " | 45 | 50 | " | " | " | " | " |
| 16 | " | " | " | " | " | " | " | " | 10 | 30 | 60 | " | " | " | " | " |
| 17 | " | " | " | " | " | " | " | " | 25 | 15 | " | " | " | " | " | " |
| 18 | " | " | " | " | " | " | " | " | 40 | 5 | 55 | " | " | " | " | " |
| 19 | " | " | " | " | " | " | " | " | 60 | 10 | 30 | " | " | " | " | " |
| 20 | " | " | " | " | " | " | " | " | 80 | 15 | 5 | " | " | " | " | " |
| 21 | " | " | " | " | " | " | " | " | 50 | 45 | 5 | " | " | " | " | " |
| 22 | " | " | " | " | " | " | " | " | 30 | 35 | 35 | 100 | — | — | — | — |
| 23 | " | " | " | " | " | " | " | " | " | " | " | — | 100 | — | — | — |
| 24 | " | " | " | " | " | " | " | " | " | " | " | — | — | 100 | — | — |
| 25 | " | " | " | " | " | " | " | " | " | " | " | — | — | — | 100 | — |
| 26 | " | " | " | " | " | " | " | " | " | " | " | — | — | — | — | 100 |
| 27 | " | " | " | " | " | " | " | " | " | " | " | 20 | 20 | 20 | 20 | 20 |
| 28 | " | " | " | " | " | " | " | " | " | " | " | 10 | 10 | 40 | 20 | 20 |
| 29 | " | " | " | " | " | " | " | " | " | " | " | 30 | 10 | 20 | 10 | 30 |
| 30 | " | " | " | " | " | " | " | " | " | " | " | 20 | 30 | — | 20 | 30 |
| 31 | " | " | " | " | " | " | " | " | " | " | " | 10 | 20 | 30 | 30 | 10 |
| 32 | " | " | " | " | " | " | " | " | " | " | " | 20 | 10 | 10 | " | 30 |
| 33 | 1.01 | 0 | — | 0 | 0.005 | 0.10 | 0.010 | " | 15 | 75 | 10 | 20 | 20 | 20 | 20 | 20 |
| 34 | " | 0.010 | — | 0.010 | " | " | " | " | " | " | " | " | " | " | " | " |
| 35 | " | 0.010 | — | 0.010 | " | " | " | " | " | " | " | " | " | " | " | " |
| 36 | " | 0.500 | — | 0.500 | " | " | " | " | " | " | " | " | " | " | " | " |
| 37 | " | 0.980 | — | 0.980 | " | " | " | " | " | " | " | " | " | " | " | " |
| 38 | " | 0.995 | — | 0.995 | " | " | " | " | " | " | " | " | " | " | " | " |
| 39 | 0.99 | — | 0 | 0 | " | " | " | " | 20 | 60 | 20 | " | " | " | " | " |
| 40 | " | — | 0.005 | 0.005 | " | " | " | " | " | " | " | " | " | " | " | " |
| 41 | " | — | 0.200 | 0.200 | " | " | " | " | " | " | " | " | " | " | " | " |
| 42 | " | — | 0.700 | 0.700 | " | " | " | " | " | " | " | " | " | " | " | " |
| 43 | " | — | 0.900 | 0.900 | " | " | " | " | " | " | " | " | " | " | " | " |
| 44 | " | — | 0.995 | 0.995 | " | " | " | " | " | " | " | " | " | " | " | " |
| 45 | 1.00 | 0 | 0 | 0 | " | " | " | " | 14 | 45 | 40 | " | " | " | " | " |
| 46 | " | 0.010 | 0.010 | 0.020 | " | " | " | " | " | " | " | " | " | " | " | " |
| 47 | " | 0.100 | 0.300 | 0.400 | " | " | " | " | " | " | " | " | " | " | " | " |
| 48 | " | 0.600 | 0.200 | 0.800 | " | " | " | " | " | " | " | " | " | " | " | " |
| 49 | " | 0.400 | 0.500 | 0.900 | " | " | 0.001 | " | " | " | " | " | " | " | " | " |
| 50 | " | 0.500 | 0.495 | 0.995 | " | " | " | " | " | " | " | " | " | " | " | " |
| 51 | 0.95 | 0.200 | 0.100 | 0.300 | 0 | 0.05 | 0.200 | 2.0 | 25 | 25 | 50 | " | " | " | " | " |
| 52 | " | " | " | " | 0.002 | " | " | " | " | " | " | " | " | " | " | " |
| 53 | " | " | " | " | 0.005 | " | " | " | " | " | " | " | " | " | " | " |
| 54 | " | " | " | " | 0.010 | " | " | " | " | " | " | " | " | " | " | " |
| 55 | " | " | " | " | 0.030 | " | " | " | " | " | " | " | " | " | " | " |
| 56 | " | " | " | " | 0.050 | " | " | " | " | " | " | " | " | " | " | " |
| 57 | " | " | " | " | 0.060 | " | " | " | " | " | " | " | " | " | " | " |
| 58 | 1.10 | 0.300 | 0.400 | 0.700 | 0 | 0.37 | 0.005 | 3.0 | 40 | " | 35 | " | " | " | " | " |
| 59 | " | " | " | " | 0.001 | " | " | " | " | " | " | " | " | " | " | " |
| 60 | " | " | " | " | 0.020 | " | " | " | " | " | " | " | " | " | " | " |
| 61 | " | " | " | " | 0.040 | " | " | " | " | " | " | " | " | " | " | " |
| 62 | " | " | " | " | 0.050 | " | " | " | " | " | " | " | " | " | " | " |
| 63 | " | " | " | " | 0.060 | " | " | " | " | " | " | " | " | " | " | " |
| 64 | 0.98 | 0.200 | 0.100 | 0.300 | 0.030 | 0 | 0.020 | 2.0 | 55 | 30 | 15 | " | " | " | " | " |
| 65 | " | " | " | " | " | 0.01 | " | " | " | " | " | " | " | " | " | " |
| 66 | " | " | " | " | " | 0.10 | " | " | " | " | " | " | " | " | " | " |
| 67 | " | " | " | " | " | 0.30 | " | " | " | " | " | " | " | " | " | " |
| 68 | " | " | " | " | " | 0.50 | " | " | " | " | " | " | " | " | " | " |
| 69 | " | " | " | " | " | 0.55 | " | " | " | " | " | " | " | " | " | " |
| 70 | 1.03 | 0 | 1.000 | 1.000 | 0 | 0.05 | 0 | 2.0 | 35 | 55 | 10 | " | " | " | " | " |
| 71 | " | 0.050 | 0.050 | 0.100 | 0.020 | " | " | " | " | " | " | " | " | " | " | " |
| 72 | " | " | " | " | " | " | 0.005 | " | " | " | " | " | " | " | " | " |
| 73 | " | " | " | " | " | " | 0.030 | " | " | " | " | " | " | " | " | " |
| 74 | " | " | " | " | " | " | 0.100 | " | " | " | " | " | " | " | " | " |
| 75 | " | " | " | " | " | " | 0.110 | " | " | " | " | " | " | " | " | " |
| 76 | 0.79 | 0.200 | 0.200 | 0.400 | 0.030 | 0.25 | 0.020 | 1.0 | 30 | 45 | 25 | " | " | " | " | " |
| 77 | 0.80 | " | " | " | " | " | " | " | " | " | " | " | " | " | " | " |
| 78 | 0.90 | " | " | " | " | " | " | " | " | " | " | " | " | " | " | " |
| 79 | 1.00 | " | " | " | " | " | " | " | " | " | " | " | " | " | " | " |
| 80 | 1.10 | " | " | " | " | " | " | " | " | " | " | " | " | " | " | " |
| 81 | 1.20 | " | " | " | " | " | " | " | " | " | " | " | " | " | " | " |
| 82 | 1.25 | " | " | " | " | " | " | " | " | " | " | " | " | " | " | " |
| 83 | 1.26 | " | " | " | " | " | " | " | " | " | " | " | " | " | " | " |
| 84 | 1.00 | 0.100 | 0.100 | 0.200 | 0.015 | 0.30 | 0.010 | 0 | 15 | 55 | 30 | " | " | " | " | " |

TABLE 1-continued

Ceramic Compositions

| Test No. | Major Ingredient (100 wt. parts) | | | | | | Additives | | | | | | | | |
|---|---|---|---|---|---|---|---|---|---|---|---|---|---|---|---|
| | | v | | | | | Amount | Composition (mole %) | | | MO (mole %) | | | | |
| | k | Sr | Ca | Sum | w | x | y | (wt. parts) | $B_2O_3$ | $SiO_2$ | MO | BaO | MgO | ZnO | SrO | CaO |
| 85 | " | " | " | " | " | " | " | 0.2 | " | " | " | " | " | " | " | " |
| 86 | " | " | " | " | " | " | " | 1.0 | " | " | " | " | " | " | " | " |
| 87 | " | " | " | " | " | " | " | 5.0 | " | " | " | " | " | " | " | " |
| 88 | " | " | " | " | " | " | " | 10.0 | " | " | " | " | " | " | " | " |
| 89 | " | " | " | " | " | " | " | 12.0 | " | " | " | " | " | " | " | " |
| 90 | 1.05 | 0.935 | — | 0.935 | 0.010 | 0.15 | 0.100 | 1.0 | 5 | 50 | 45 | " | " | " | " | " |
| 91 | " | — | 0.935 | " | 0.030 | " | " | " | " | " | " | " | " | " | " | " |
| 92 | " | 0.400 | 0.535 | " | 0.040 | " | " | " | " | " | " | " | " | " | " | " |
| 93 | " | " | " | " | 0.050 | " | " | " | " | " | " | " | " | " | " | " |
| 94 | " | " | " | " | 0.055 | " | " | " | " | " | " | " | " | " | " | " |
| 95 | 1.00 | 0.620 | 0.380 | 1.000 | 0 | 0.95 | 0 | 2.0 | 15 | 25 | 60 | " | " | " | " | " |
| 96 | " | 0.400 | 0.300 | 0.700 | 0.010 | 0.50 | 0.010 | " | " | " | " | " | " | " | " | " |
| 97 | " | 1.00 | 0 | 1.000 | 0 | 0.05 | 0 | 3.0 | 10 | 30 | " | " | 30 | 0 | " | 30 |
| 98 | " | 0.700 | 0.050 | 0.750 | 0.020 | 0.05 | 0.010 | " | " | " | " | " | " | " | " | " |

According to Table 1, the major ingredient of the dielectric bodies of the capacitors of Test No. 1 was:

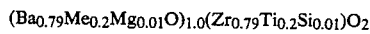

or, more specifically, since $Me_{0.2}$ was $Sr_{0.1}Ca_{0.1}$,

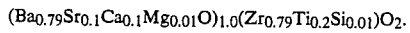

One hundred parts of this major ingredient was admixed with 1.0 part by weight of a mixture of one mole percent $B_2O_3$, 80 mole percent $SiO_2$ and 19 mole percent MO. MO was a mixture of 20 mole percent BaO, 20 mole percent MgO, 20 mole percent ZnO, 20 mole percent SrO and 20 mole percent CaO.

For the fabrication of the capacitors of Test No. 1 we started with the preparation of the major ingredient of their dielectric bodies. We prepared the following start materials for the major ingredient:

Barium carbonate ($BaCO_3$)
  527.70 grams (0.79 mole part)
Strontium carbonate ($SrCO_3$)
  49.97 grams (0.10 mole part)
Calcium carbonate ($CaCO_3$)
  33.85 grams (0.10 mole part)
Magnesium carbonate ($MgCO_3$)
  2.85 grams (0.01 mole part)
Zirconium oxide ($ZrO_2$)
  329.50 grams (0.79 mole part)
Titanium oxide ($TiO_2$)
  54.09 grams (0.20 mole part)
Silica ($SiO_2$)
  2.04 grams (0.01 mole part)

These start materials had all purities of not less than 99.0 percent. The above specified weights of the start materials do not include those of the impurities contained. We charged the start materials into a pot mill together with alumina balls and 2.5 liters of water and mixed them together for 15 hours. Then the mixture was introduced into a stainless steel vat and therein dried by air heated to 150° C. for four hours. Then the dried mixture was crushed into relatively coarse particles, which were subsequently fired in air within a tunnel furnace at 1200° C. for two hours. There was thus obtained the major ingredient of the above specified composition in finely divided form.

For the provision of the additives of Test No. 1 we prepared:

$B_2O_3$ ... 0.99 grams (1.0 mole percent)
$SiO_2$ ... 68.38 grams (80.00 mole percent)
$BaCO_3$ ... 10.67 grams (3.8 mole percent)
MgO ... 2.18 grams (3.8 mole percent)
ZnO ... 4.40 grams (3.8 mole percent)
$SrCO_3$ ... 7.98 grams (3.8 mole percent)
$CaCO_3$ ... 5.41 grams (3.8 mole percent)

To these substances we added 300 cubic centimeters of alcohol and stirred the resulting slurry for 10 hours in a polyethylene pot with alumina balls. Then the mixture was air fired at 1000° C. for two hours. Then, charged into an alumina pot together with 300 cubic centimeters of water, the fired mixture was pulverized with alumina balls over a period of 15 hours. Then the pulverized mixture was dried at 150° C. for four hours. There was thus obtained in finely divided form the desired additive mixture of one mole percent $B_2O_3$, 80 mole percent $SiO_2$ and 19 mole percent MO, with the MO consisting of 3.8 mole percent BaO, 3.8 mole percent MgO, 3.8 mole percent ZnO, 3.8 mole percent SrO and 3.8 mole percent CaO.

Ten grams (one weight part) of this additive mixture was added to 1000 grams (100 weight parts) of the above prepared major ingredient. Further, to this mixture, we added 15 percent by weight of an organic binder and 50 percent by weight of water with respect to the total weight of the major ingredient and additives. The organic binder was an aqueous solution of acrylic ester polymer, glycerine, and condensed phosphate. The mixture of all these was ball milled into a slurry. Then this slurry was defoamed in vacuum.

Then we charged the defoamed slurry into a reverse roll coater and shaped it into a thin, continuous strip on an elongate supporting strip of polyester film. Then the strip was dried by heating to 100° C. on the supporting film. The green ceramic strip thus obtained, approximately 25 microns thick, was subsequently punched into "squares" sized 10 by 10 centimeters. These green ceramic squares are to become the ceramic layers 12, FIG. 1, in the completed test capacitors 10.

For the fabrication of the base metal film electrodes 14 on the ceramic layers 12, we prepared 10 grams of nickel in finely divided form, with an average particle size of 1.5 microns, and a solution of 0.9 gram of ethyl cellulose in 9.1 grams of butyl "Carbitol" (trademark for diethylene glycol monobutyl ether). Both were intimately intermingled by being agitated for 10 hours, thereby providing an electroconductive paste. Then this paste was "printed" on one surface of each green ceramic square, which had been prepared as above described, through a screen having 50 perforations of rectangular shape, each sized seven by 14 millimeters.

After drying the printed paste, we stacked two green squares, with their printings directed upwardly, and with the printings on the two squares offset from each other to an extent approximately half the pitch of their patterns in the longitudinal direction. The thus stacked two printed squares were placed between two separate stacks of four unprinted squares esch with a thickness of 60 microns. The resulting stack of printed and unprinted squares were pressed in their thickness direction under a pressure of approximately 40 tons at 50° C., thereby firmly bonding the stacked squares to one another. Then the bonded squares were cut in a latticed pattern into 50 laminate chips of identical construction.

We employed a furnace capable of atmosphere control for cofiring the above prepared green dielectric bodies and, buried therein, the conductive layers which were to become the film electrodes 14 in the completed capacitors 10. The chips were first air heated in this furnace to 600° C. at a rate of 100° C. per hour, thereby driving off the organic binder that had been used for providing the slurry of the powdered major ingredient and additives. Then the furnace atmosphere was changed from air to a reductive (nonoxidative) atmosphere consisting of two percent by volume of molecular hydrogen and 98 percent by volume of molecular nitrogen. In this reductive atmosphere the furnace temperature was raised from 600° C. to 1170° C. at a rate of 100° C. per hour. The maximum temperature of 1170° C., at which the ceramic bodies formulated in accordance with our invention were to be sintered to maturity, was maintained for three hours. Then the furnace temperature was lowered to 600° C. at a rate of 100° C. per hour. Then, with the furnace atmosphere again changed to air (oxidative atmosphere), the temperature of 600° C. was maintained for 30 minutes for the oxidizing heat treatment of the sintered chips. Then the furnace temperature was allowed to drop to room temperature.

Thus we obtained the dielectric ceramic bodies 15, FIG. 1, cosintered with the film electrodes 14 buried therein.

We proceeded to the production of the air of conductive terminations 16 on both sides of each ceramic body 15 through which were exposed the film electrodes 14. First, for the production of the inmost zinc layers 18, a conductive paste composed of zinc, glass frit and vehicle was coated on both sides of each ceramic body 15. The coatings on drying were air heated to 550° C. and maintained at that temperature for 15 minutes, thereby completing the zinc layers 18 each in direct contact with one of the two film electrodes 14. Then the intermediate copper layers 20 were formed over the zinc layers 18 by electroless plating. Then the outermost solder layers 22 were formed by electroplating a lead tin alloy over the copper layers 20.

We have thus completed the fabrication of monolithic, multilayered ceramic test capacitors 10, each constructed as in FIG. 1, in accordance with the ceramic composition of Test No. 1 of Table 1. The composition of the ceramic bodies 15 of the thus completed capacitors 10 proved substantially akin to that before sintering. It is therefore reasoned that the sintered ceramic bodies 15 are of perovskite structures, with the additives (1.0 mole percent $B_2O_3$, 80.0 mole percent $SiO_2$, 3.8 mole percent BaO, 3.8 mole percent MgO, 3.8 mole percent ZnO, 3.8 mole percent SrO and 3.8 mole percent CaO) uniformly dispersed among the crystal grains of the major ingredient.

As for the other ceramic compositions of Table 1, designated Tests Nos. 2 through 98, we made similar capacitors through exactly the same procedure as that set forth in the foregoing in connection with the Test No. 1 composition, except for the temperature of sintering in the reductive atmosphere, which will be referred to presently.

Then we tested all the capacitors of Tests Nos. 1–98 as to their specific dielectric constants, temperature coefficients of capacitance, Q factors, resistivities, and bending strengths. The following are the methods we employed for the measurement of these properties:

Specific Dielectric Constant

The capacitance of each test capacitor was first measured at a temperature of 20° C., a frequency of one megahertz, and an effective alternating voltage of 0.5 volt. Then the specific dielectric constant was computed from the measured value of capacitance, the area (25 square millimeters) of each of the overlapping parts of the two film electrodes 14, and the thickness (0.02 millimeter) of that ceramic layer 12 which intervenes between the film electrodes.

Temperature Coefficient of Capacitance

The capacitance $C_{85}$ at 85° C. and capacitance $C_{20}$ at 20° C. of each test capacitor were first measured. Then the temperature coefficient TC of capacitance was computed by the equation $$TC = (C_{85} - C_{20})/C_{20} \times 1/65 \times 10^6.$$

Q Factor

The Q factor was measured by a Q meter at a frequency of one megahertz, a temperature of 20° C., and an effective alternating voltage of 0.5 volt.

Resistivity

Resistance across the pair of conductive terminations 16 of each test capacitor 10 was measured after the application of a direct voltage of 50 volts for one minute at a temperature of 20° C. Then the resistivity was computed from the measured resistance value and the size of the test capacitors.

Bending Strength

Figure 2:
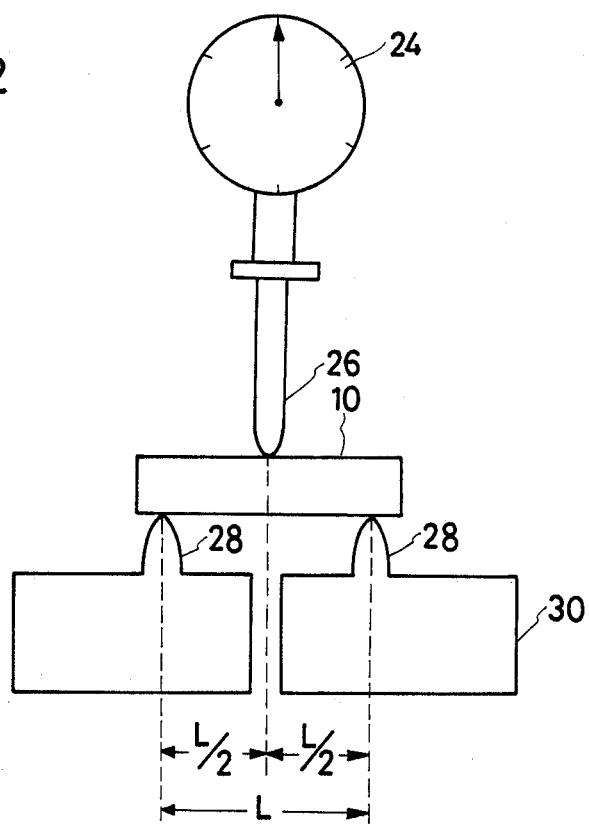
FIG. 2 is a diagrammatic illustration of apparatus used for measuring the bending strength of the test capacitors.

We employed the apparatus of FIG. 2 for the measurement of bending strength. The apparatus includes a dial gage 24 having a thrust rod 26 to be loaded endwise against the center of each test capacitor 10. The test capacitor 10 was placed on a pair of parallel spaced ribs 28 formed on fixed supports 30. We read from the dial gage 24 the load that has been exerted on the thrust rod 26 at the time of the breakage of the test capacitor, and computed the bending strength (kg/cm$^2$) by the equation:

$$\text{Bending strength} = (3P \cdot L)/(2b \cdot d^2)$$

where:
P = the maximum reading in kilograms of the dial gage 24;

L=the distance in centimeters between the pair of ribs 28;
b=the length in centimeters of each side of the test capacitor 10; and
d=the thickness in centimeters of the test capacitor 10.

The dimensions b and d of the test capacitor are subject to change from specimen to specimen. Typical values of b and d were 0.52 and 0.04 centimeter, respectively.

Table 2 gives the results of the measurements by the above described methods, as well as the maximum temperatures at which the test capacitors were sintered in the reductive atmosphere during their manufacture.

TABLE 2

Firing Temperature & Capacitor Characteristics

| Test No. | Firing Temp. (°C.) | Specific Dielectric Constant | Temperature Coefficient of Capacitance (ppm/°C.) | Q Factor | Resistivity (megohm-cm) | Bending Strength (kg/cm$^2$) |
|---|---|---|---|---|---|---|
| 1 | 1160 | 59 | −430 | 8700 | 2.4 × 10$^8$ | 1680 |
| 2 | " | 60 | −410 | 8500 | 2.6 × 10$^8$ | 1700 |
| 3 | " | 62 | −440 | 8900 | 2.3 × 10$^8$ | 1670 |
| 4 | " | 60 | −420 | 9000 | 2.4 × 10$^8$ | 1690 |
| 5 | " | 58 | −400 | 8700 | 2.5 × 10$^8$ | 1720 |
| 6 | " | 61 | −420 | 8400 | 2.7 × 10$^8$ | 1730 |
| 7 | 1300 | | Not coherently bonded on firing. | | | |
| 8 | " | | " | | | |
| 9 | " | | " | | | |
| 10 | " | | " | | | |
| 11 | " | | " | | | |
| 12 | " | | " | | | |
| 13 | 1160 | 60 | −400 | 8700 | 2.3 × 10$^8$ | 1700 |
| 14 | " | 62 | −410 | 8600 | 2.4 × 10$^8$ | 1710 |
| 15 | " | 58 | −450 | 9000 | 2.6 × 10$^8$ | 1690 |
| 16 | " | 59 | −420 | 8800 | 2.5 × 10$^8$ | 1670 |
| 17 | " | 61 | −430 | 8500 | 2.1 × 10$^8$ | " |
| 18 | " | 62 | −420 | 8400 | 2.7 × 10$^8$ | 1730 |
| 19 | " | 59 | −400 | 8800 | 2.6 × 10$^8$ | 1700 |
| 20 | " | 58 | −440 | 9000 | 2.5 × 10$^8$ | 1680 |
| 21 | " | 61 | −420 | 9100 | 2.7 × 10$^8$ | 1690 |
| 22 | " | 60 | −450 | 8800 | 2.6 × 10$^8$ | 1660 |
| 23 | " | 63 | −400 | 8600 | 2.2 × 10$^8$ | 1700 |
| 24 | " | 59 | −410 | 8700 | 2.3 × 10$^8$ | 1710 |
| 25 | " | 58 | −430 | " | " | " |
| 26 | " | 57 | −400 | 8600 | " | " |
| 27 | " | 61 | −450 | 8500 | 2.2 × 10$^8$ | 1730 |
| 28 | " | 63 | −420 | 8800 | 2.6 × 10$^8$ | 1670 |
| 29 | " | 62 | −410 | 9000 | 2.7 × 10$^8$ | 1650 |
| 30 | " | 60 | −400 | 8700 | 2.6 × 10$^8$ | 1660 |
| 31 | " | 59 | −420 | 8800 | 2.3 × 10$^8$ | 1700 |
| 32 | " | 61 | −440 | 9000 | 2.5 × 10$^8$ | 1710 |
| 33 | 1170 | 43 | −210 | 8700 | 6.9 × 10$^7$ | 1400 |
| 34 | 1160 | 46 | −220 | 8800 | 1.0 × 10$^8$ | 1500 |
| 35 | " | 48 | −240 | " | 1.9 × 10$^8$ | 1550 |
| 36 | " | 47 | −230 | 8700 | 2.4 × 10$^8$ | 1600 |
| 37 | 1170 | 46 | " | 8600 | 2.0 × 10$^8$ | 1530 |
| 38 | 1180 | 41 | −200 | 8200 | 9.0 × 10$^7$ | 1300 |
| 39 | 1170 | 42 | −190 | 7900 | 7.0 × 10$^7$ | 1330 |
| 40 | 1160 | 46 | −210 | 8500 | 1.3 × 10$^8$ | 1520 |
| 41 | 1150 | 47 | −220 | 8600 | 1.7 × 10$^8$ | 1590 |
| 42 | " | 46 | −230 | 8500 | 2.0 × 10$^8$ | 1570 |
| 43 | 1160 | 45 | −210 | 8400 | 1.9 × 10$^8$ | 1510 |
| 44 | 1170 | 42 | " | 8100 | 9.7 × 10$^7$ | 1290 |
| 45 | " | 40 | −200 | 8500 | 7.3 × 10$^7$ | 1380 |
| 46 | 1160 | 44 | −210 | 8700 | 1.6 × 10$^8$ | 1520 |
| 47 | 1150 | 47 | " | 9000 | 2.0 × 10$^8$ | 1570 |
| 48 | 1140 | " | −220 | 8900 | 3.0 × 10$^8$ | 1600 |
| 49 | 1160 | 46 | −230 | 8800 | 1.9 × 10$^8$ | 1550 |
| 50 | 1170 | 44 | −220 | 8600 | 8.3 × 10$^7$ | 1410 |
| 51 | 1180 | 43 | −35 | 8100 | 9.0 × 10$^7$ | 1300 |
| 52 | 1150 | 42 | −40 | 8300 | 1.2 × 10$^8$ | 1520 |
| 53 | 1140 | 40 | −50 | 8400 | 2.9 × 10$^8$ | 1600 |
| 54 | 1130 | 42 | −40 | 8300 | 3.3 × 10$^8$ | 1610 |
| 55 | " | 44 | −30 | 8100 | 2.8 × 10$^8$ | 1580 |
| 56 | 1190 | 46 | −20 | 7900 | 1.0 × 10$^8$ | 1520 |
| 57 | 1300 | | Not coherently bonded on firing. | | | |
| 58 | 1160 | 90 | −840 | 8100 | 8.0 × 10$^7$ | 1260 |
| 59 | 1140 | 85 | −870 | 8000 | 1.3 × 10$^8$ | 1500 |
| 60 | 1130 | 87 | −840 | 8200 | 2.2 × 10$^8$ | 1590 |
| 61 | 1150 | 91 | −800 | 8300 | 2.6 × 10$^8$ | 1600 |
| 62 | 1170 | 96 | −780 | 8000 | 2.1 × 10$^8$ | 1530 |
| 63 | 1200 | 99 | −760 | 7400 | 1.3 × 10$^7$ | 1390 |
| 64 | 1400 | 35 | +45 | 7700 | 3.8 × 10$^8$ | 1520 |
| 65 | 1130 | 36 | 0 | 8000 | 3.7 × 10$^8$ | 1540 |

TABLE 2-continued

Firing Temperature & Capacitor Characteristics

| Test No. | Firing Temp. (°C.) | Specific Dielectric Constant | Temperature Coefficient of Capacitance (ppm/°C.) | Q Factor | Resistivity (megohm-cm) | Bending Strength (kg/cm²) |
|---|---|---|---|---|---|---|
| 66 | 1120 | 46 | −190 | 8100 | 3.5 × 10⁸ | 1560 |
| 67 | 1110 | 75 | −720 | 8600 | 3.4 × 10⁸ | 1600 |
| 68 | 1120 | 134 | −1000 | 8800 | 3.1 × 10⁸ | " |
| 69 | " | 152 | −1430 | 8900 | 2.7 × 10⁸ | 1590 |
| 70 | 1180 | 41 | −50 | 8200 | 7.0 × 10⁷ | 1300 |
| 71 | 1160 | 43 | −40 | 8400 | 1.3 × 10⁸ | 1440 |
| 72 | 1140 | " | " | 8300 | 2.5 × 10⁸ | 1600 |
| 73 | 1130 | 41 | −30 | 7900 | 2.0 × 10⁸ | 1580 |
| 74 | 1120 | 38 | −20 | 7000 | 1.2 × 10⁸ | 1540 |
| 75 | 1110 | 33 | −10 | 3000 | 8.0 × 10⁷ | 1400 |
| 76 | 1300 | Not coherently bonded on firing. | | | | |
| 77 | 1190 | 88 | −550 | 7700 | 1.2 × 10⁸ | 1520 |
| 78 | 1160 | 87 | −570 | 8000 | 1.7 × 10⁸ | 1600 |
| 79 | 1150 | 85 | −590 | 8500 | 2.3 × 10⁸ | 1630 |
| 80 | " | 83 | −610 | 9000 | 2.4 × 10⁸ | 1640 |
| 81 | 1170 | 80 | −630 | 8900 | 2.3 × 10⁸ | 1620 |
| 82 | 1190 | 78 | −650 | 8800 | 2.4 × 10⁸ | 1580 |
| 83 | 1300 | Not coherently bonded on firing. | | | | |
| 84 | " | " | | | | |
| 85 | 1180 | 88 | −790 | 9500 | 1.9 × 10⁸ | 1580 |
| 86 | 1150 | 87 | −750 | 9100 | 2.4 × 10⁸ | 1600 |
| 87 | 1100 | 79 | −660 | 7900 | " | 1530 |
| 88 | 1070 | 74 | −610 | 5900 | 2.0 × 10⁸ | 1500 |
| 89 | 1040 | 65 | −590 | 2900 | 9.3 × 10⁷ | 1190 |
| 90 | 1140 | 56 | −340 | 8000 | 1.6 × 10⁸ | 1520 |
| 91 | 1150 | 55 | −340 | 8200 | 3.7 × 10⁸ | 1590 |
| 92 | 1160 | 54 | −330 | 7800 | 3.5 × 10⁸ | 1620 |
| 93 | 1170 | 51 | −300 | 7600 | 2.7 × 10⁸ | 1560 |
| 94 | 1190 | 48 | −280 | 6300 | 5.0 × 10⁷ | 1400 |
| 95 | 1160 | 250 | −720 | 9700 | 1.7 × 10⁷ | 1190 |
| 96 | 1120 | 133 | −1000 | 8900 | 3.4 × 10⁸ | 1580 |
| 97 | 1100 | 37 | −45 | 8300 | 2.8 × 10⁷ | 1310 |
| 98 | " | 38 | −40 | 8400 | 5.0 × 10⁸ | 1600 |

It will be noted from Table 2 that the specific dielectric constants of the Test No. 1 capacitors, for instance, averaged 59, their temperature coefficients of capacitance −430 ppm per degree C., their Q factors 8700, their resistivities 2.4×10⁸ megohm-centimeters, and their bending strengths 1680 kilograms per square centimeter. The temperature coefficients of the capacitances of the test capacitors were practically constant in the normal range of their operating temperatures.

It will further be observed from Table 2 that the dielectric bodies of Tests Nos. 7–12, 57, 76, 83 and 84 were not coherently bonded on firing at temperatures as high as 1300° C. in the reductive atmosphere. The corresponding ceramic compositions of Table 1 fall outside the scope of our invention. The dielectric bodies of all the other Tests could be sintered to maturity at temperatures less than 1200° C.

Before proceeding further with the examination of the results of Table 2 we will determine the acceptable criteria of the five electrical and mechanical properties in question for the ceramic capacitors provided by our invention. These criteria are:

Specific dielectric constant:
  From 35 to 135.
Temperature coefficient of capacitance:
  From −1000 to +45 ppm per degree C.
Q factor:
  Not less than 5000.
Resistivity:
  Not less than 1×10⁸ megohm-cm.
Bending strenth:
  Not less than 1500 kg/cm².

A reconsideration of Table 2 in light of the above established criteria of favorable electrical and mechanical characteristics will reveal that the capacitors of Tests Nos. 33, 38, 39, 44, 45, 50, 51, 58, 63, 69, 70, 71, 75, 89, 94, 95 and 97 do not meet these criteria. Accordingly, the corresponding ceramic compositions of Table 1 also fall outside the scope of our invention. All the test capacitors but those of Tests Nos. 7–12, 33, 38, 39, 44, 45, 50, 51, 57, 58, 63, 69, 70, 71, 75, 76, 83, 84, 89, 94, 95 and 97 satisfy the criteria, so that their ceramic compositions are in accord with our invention.

Now, let us study the ceramic compositions of Table 1 and the corresponding capacitor characteristics, as well as the sintering temperatures, of Table 2 in more detail. The ceramic composition of Test No. 84 contained no additive specified by our invention. The dielectric bodies formulated accordingly were not coherently bonded on firing at a temperature as high as 1300° C. Consider the ceramic composition of Test No. 85 for comparison. They contained 0.2 part by weight of the additives with respect to 100 parts by weight of the major ingredient. Even though the firing temperature was as low as 1180° C., the resulting test capacitors possessed all the desired characteristics. We set, therefore, the lower limit of the possible proportions of the additive mixture at 0.2 part by weight with respect to 100 parts by weight of the major ingredient.

The Test No. 89 ceramic composition contained as much as 12 parts by weight of the additives with respect to 100 parts by weight of the major ingredient. The resulting Test No. 89 capacitors had a Q factor of 2900, a resistivity of 9.3×10⁷ megohm-cm, and a bending strength of 1190 kg/cm, which are all far less than the above established criteria. When the proportion of the additive mixture was reduced to 10 parts by weight, as in Test No. 88, the resulting capacitors had all the desired characteristics. Therefore, we set the upper limit of the possible proportions of the additive mixture at 10 parts by weight with respect to 100 parts by weight of the major ingredient.

As for the major ingredient, we tested various values for the subscripts v, w, x, y and k of the general formula in order to determine desirable ranges of such values. First of all, the value of v was set at zero in Tests Nos. 33, 39 and 45 and at 0.995 in Tests Nos. 38, 44 and 50. In the resulting capacitors the resistivities and bending strengths fell short of the criteria. All the desired characteristics could be obtained when the value of v was set at 0.005 as in Test No. 40, at 0.980 as in Test No. 37, and at various values in between. Thus the desired range of values of v is between 0.005 and 0.980.

The value of w was set at 0 in Tests Nos. 51, 58, 70, 95 and 97. The resulting capacitors were unsatisfactory in both resistivity and bending strength. Desired degrees of resistivity and bending strength could not be obtained, either, when the value of w was made as high as 0.060 as in Tests Nos. 57 and 63 or 0.055 as in Test No. 94. The desired characteristics were all realized when the value of w was set at 0.001 as in Test No. 59 and at 0.050 as in Test No. 56 and 62. The acceptable range of values of w is therefore from 0.001 to 0.050.

The value of 0.55 chosen for x in Test No. 69 was too high because the resulting capacitors had a temperature coefficient of only $-1430$ ppm/°C., considerably less than the criterion of $-1000$ ppm/°C. When the value of x was set in the range of 0.00–0.50 as in Tests Nos. 64–68, the temperature coefficients of the resulting capacitors fell in the target range of $-1000-+45$ ppm/°C. Thus the desired range of values of x is from 0.00 to 0.50. It should be noted that the desired characteristics are obtainable if the value of x is zero as in Test No. 64, that is, if the major ingredient contained no titanium.

The value of y was set at zero in Test No. 71, and the resulting capacitors had a bending strength of only 1440, less than the criterion of 1500 kg/cm². As evidenced by Test No. 72, a bending strength of as high as 1600 kg/cm² was obtained when the value of y was set at 0.005. However, when the value of y was increased to 0.110 as in Test No. 75, the resulting capacitors were unsatisfactory in Q factor, resistivity and bending strength. Satisfactory characteristics resulted when the value of y was decreased to 0.100 as in Test No. 74. Accordingly, the desired range of values of y is from 0.005 to 0.100.

When the value of k was set at 0.79 as in Test No. 76 and at 1.26 as in Test No. 83, the resulting dielectric bodies were not coherently bonded on firing at a temperature of as high as 1300° C. Coherently bonded ceramic bodies were obtained, and the capacitor characteristics were satisfactory, when the value of k was set in the range of 0.80–1.25 as in Tests Nos. 77–82. The desired range of values of k is therefore from 0.80 to 1.25.

We included in these Tests some closest prior art ceramic compositions in order to clearly illustrate the advantages of our present invention over such prior art.

Test No. 70 represents one prior art ceramic composition whose major ingredient is:

$(CaO)_{1.03}(Zr_{0.95}Ti_{0.05})O_2$.

Test No. 95 represents another prior art ceramic composition whose major ingredient is:

$(Sr_{0.62}Ca_{0.38}O)(Zr_{0.05}Ti_{0.95})O_2$.

Test No. 97 represents still another prior art ceramic composition whose major ingredient is:

$(Sr_{1.00}O)_{1.00}(Zr_{0.95}Ti_{0.05})O_2$.

A comparison of the characteristics of the prior art ceramic capacitors of these Tests with those of the inventive capacitors of, for example, Tests Nos. 72–74, 96 and 98 will reveal marked improvements in resistivity and bending strength in particular, obviously by reason of the additional inclusion of Ba, Mg and Si in the major ingredient in accordance with our invention.

Figure 3:
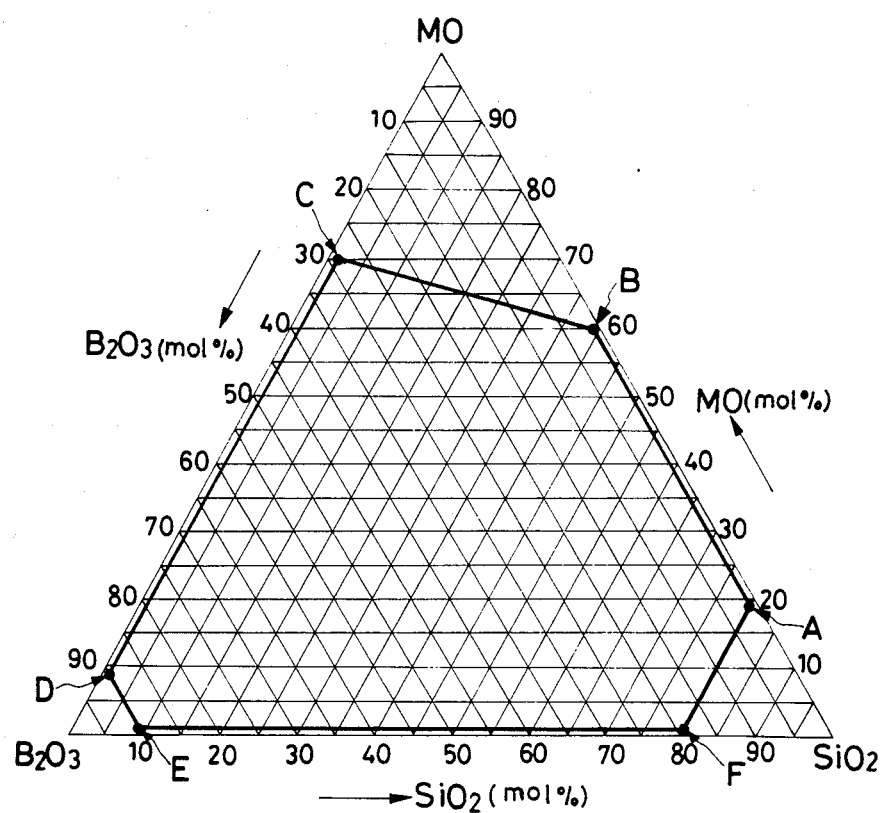
FIG. 3 is a ternary diagram depicting the relative proportions of the additives of the ceramic compositions in accordance with our invention.

We have ascertained from the results of Table 2 that the acceptable range of the relative proportions of $B_2O_3$, $SiO_2$ and MO, the additives of the ceramic compositions in accordance with our invention, can be definitely stated in reference to the ternary diagram of FIG. 3.

The point A in the ternary diagram indicates the Test No. 1 additive composition of one mole percent $B_2O_3$, 80 mole percent $SiO_2$ and 19 mole percent MO. The point B indicates the Test No. 2 additive composition of one mole percent $B_2O_3$, 39 mole percent $SiO_2$ and 60 mole percent MO. The point C indicates the Test No. 3 additive composition of 29 mole percent $B_2O_3$, one mole percent $SiO_2$ and 70 mole percent MO. The point D indicates the Test No. 4 additive composition of 90 mole percent $B_2O_3$, one mole percent $SiO_2$ and nine mole percent MO. The point E indicates the Test No. 5 additive composition of 90 mole percent $B_2O_3$, nine mole percent $SiO_2$ and one mole percent MO. The point F indicates the Test No. 6 additive composition of 19 mole percent $B_2O_3$, 80 mole percent $SiO_2$, and one mole percent MO.

The relative proportions of the additives $B_2O_3$, $SiO_2$ and MO of the ceramic compositions in accordance with our invention are within the region bounded by the lines sequentially connecting the above stated points A, B, C, D, E and F in the ternary diagram of FIG. 3.

Tables 1 and 2 prove that the additive compositions within the above defined region makes possible the provision of capacitors of the desired electrical and mechanical characteristics. The additive compositions of Tests Nos. 7–12 all fall outside that region, and the corresponding dielectric bodies were not coherently bonded on firing at a temperature of as high as 1300° C. The above specified acceptable range of the relative proportions of the additives holds true regardless of whether only one of BaO, MgO, ZnO, SrO and CaO is employed as MO, as in Tests Nos. 22–26, or two or more or all of them are employed in suitable relative proportions as in other Tests.

Although we have disclosed our invention in terms of specific Examples thereof, we understand that our invention is not to be limited by the exact details of such disclosure but admits of a variety of modifications or alterations within the usual knowledge of the ceramists, chemists or electricians without departing from the scope of the invention. The following, then, is a brief list of such possible modifications or alterations:

1. The low temperature sinterable ceramic compositions of our invention may include various additives other than those disclosed herein. An example is a mineralizer such as manganese dioxide. Used in a proportion (preferably from 0.05 to 0.10 percent by weight) not adversely affecting the desired characteristics of the resulting capacitors, such a mineralizer will lead to the improvement of sinterability.

2. The start materials of the ceramic compositions in accordance with our invention may be substances such as oxides or hydroxides other than those employed in the foregoing Examples.

3. The temperature of the oxidizing heat treatment need not necessarily be 600° C. but can be variously determined in a range (from 500° to 1000° C., for the best results) not exceeding the temperature of the preceding sintering in a nonoxidative atmosphere, the oxidizing temperature being dependent upon factors such as the particular base metal electrode material in use and the degree of oxidation required for the ceramic material.

4. The temperature of cosintering in a nonoxidative atmosphere may also be changed in consideration of the particular electrode material in use. We recommend a range of 1050° to 1200° C. if the electrode material is nickel, as we have ascertained from experiment that little or no flocculation of the nickel particles takes place in that temperature range.

5. The dielectric bodies and electrodes may be cosintered in a neutral, instead of reductive, atmosphere.

6. The ceramic compositions disclosed herein may be employed for capacitors other than those of the multilayered configuration.

What we claim is:

1. A low temperature sintered solid dielectric capacitor comprising a dielectric ceramic body and at least two electrodes in contact therewith, the dielectric ceramic body consisting essentially of:
   (a) 100 parts by weight of a major ingredient expressed by the formula, $(Ba_{1-v-w}Me_vMg_wO)_k(Zr_{1-x-y}Ti_xSi_y)O_2$, 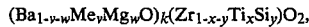

where
   Me is at least either of strontium and calcium;
   v is a numeral in the range of 0.005 to 0.980 inclusive;
   w is a numeral in the range of 0.001 to 0.050 inclusive;
   x is a numeral in the range of 0.00 to 0.50 inclusive;
   y is a numeral in the range of 0.005 to 0.100 inclusive; and
   k is a numeral in the range of 0.80 to 1.25 inclusive; and
   (b) from 0.2 to 10.0 parts by weight of an additive mixture of boric oxide, silicon dioxide and at least one metal oxide selected from the group consisting of barium oxide, magnesium oxide, zinc oxide, strontium oxide and calcium oxide, the relative proportions of boric oxide, silicon dioxide and at least one selected metal oxide constituting the additive mixture being in that region of the ternary diagram of FIG. 3 attached hereto which is bounded by lines sequentially connecting:
   the point A where the additive mixture consists of one mole percent boric oxide, 80 mole percent silicon dioxide, and 19 mole percent metal oxide;
   the point B where the additive mixture consists of one mole percent boric oxide, 39 mole percent silicon dioxide, and 60 mole percent metal oxide;
   the point C where the additive mixture consists of 29 mole percent boric oxide, one mole percent silicon dioxide, and 70 mole percent metal oxide;
   the point D where the additive mixture consists of 90 mole percent boric oxide, one mole percent silicon dioxide, and nine mole percent metal oxide;
   the point E where the additive mixture consists of 90 mole percent boric oxide, nine mole percent silicon dioxide, and one mole percent metal oxide; and
   the point F where the additive mixture consists of 19 mole percent boric oxide, 80 mole percent silicon dioxide, and one mole percent metal oxide.

2. A low temperature sintered solid dielectric capacitor as set forth in claim 1, wherein the electrodes are buried in the dielectric ceramic body.

3. A low temperature sintered solid dielectric capacitor as set forth in claim 1, wherein the electrodes are of a base metal.

4. A low temperature sintered solid dielectric capacitor as set forth in claim 3, wherein the base metal is nickel.

5. A process for the manufacture of a low temperature sintered solid dielectric capacitor, which process comprises:
   (a) providing a mixture of:
      100 parts by weight of a major ingredient, in finely divided form, that is expressed by the formula, $(Ba_{1-v-w}Me_vMg_wO)_k(Zr_{1-x-y}Ti_xSi_y)O_2$, 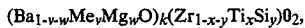

where
      Me is at least either of strontium and calcium;
      v is a numeral in the range of 0.005 to 0.980 inclusive;
      w is a numeral in the range of 0.001 to 0.050 inclusive;
      x is a numeral in the range of 0.00 to 0.50 inclusive;
      y is a numeral in the range of 0.005 to 0.100 inclusive; and
      k is a numeral in the range of 0.80 to 1.25 inclusive; and
      from 0.2 to 10.0 parts by weight of an additive mixture, in finely divided form, of boric oxide, silicon dioxide and at least one metal oxide selected from the group consisting of barium oxide, magnesium oxide, zinc oxide, strontium oxide and calcium oxide, the relative proportions of boric oxide, silicon dioxide and at least one selected metal oxide constituting the additive mixture being in that region of the ternary diagram of FIG. 3 attached hereto which is bounded by lines sequentially connecting:
      the point A where the additive mixture consists of one mole percent boric oxide, 80 mole percent silicon dioxide, and 19 mole percent metal oxide;
      the point B where the additive mixture consists of one mole percent boric oxide, 39 mole percent silicon dioxide, and 60 mole percent metal oxide;
      the point C where the additive mixture consists of 29 mole percent boric oxide, one mole percent silicon dioxide, and 70 mole percent metal oxide;

the point D where the additive mixture consists of 90 mole percent boric oxide, one mole percent silicon dioxide, and nine mole percent metal oxide;

the point E where the additive mixture consists of 90 mole percent boric oxide, nine mole percent silicon dioxide, and one mole percent metal oxide; and the point F where the additive mixture consists of 19 mole percent boric oxide, 80 mole percent silicon dioxide, and one mole percent metal oxide;

(b) molding the mixture into desired shape and size, the molding having at least two electrode portions of an electroconductive material;

(c) cosintering the molding and the electrode portions to maturity in a nonoxidative atmosphere; and (d) reheating the cosintered molding and electrode portions in an oxidative atmosphere.

6. A process for the manufacture of a low temperature sintered solid dielectric capacitor as set forth in claim 5, wherein the electrode portions are formed on the molding by coating the same with an electroconductive paste composed principally of a base metal.

7. A process for the manufacture of a low temperature sintered solid dielectric capacitor as set forth in claim 6, wherein the base metal is nickel.

8. A process for the manufacture of a low temperature sintered solid dielectric capacitor as set forth in claim 5, wherein the molding and the electrode portions are cosintered to maturity in a temperature range of 1050° to 1200° C.

9. A process for the manufacture of a low temperature sintered solid dielectric capacitor as set forth in claim 5, wherein the cosintered molding and electrode portions are reheated in a temperature range of 500° to 1000° C.

* * * * *

UNITED STATES PATENT AND TRADEMARK OFFICE
CERTIFICATE OF CORRECTION

PATENT NO. : 4,809,131
DATED : Feb. 28, 1989
INVENTOR(S) : Hirokazu Chazono,; Minoru Oshio; Hiroshi Kishi It is certified that error appears in the above-identified patent and that said Letters Patent is hereby corrected as shown below:

Col. 2, line 3, in the formula, change "$Ti_2$" to -- $Ti_x$ --.

Col. 5, Table 1, Test No. 35, Column "Sr", change "0.010" to --0.100--.

Col. 5, Table 1, Test No. 35, Column "Sum", change "0.010" to --0.100--.

Col. 9, line 46, change "air" to --pair--.

Col. 12, Table 2, Test No. 64, "Firing Temp. (°C.)", change "1400" to --1140--.

Col. 15, line 1, change "kg/cm" to --$kg/cm^2$--.

Col. 18, line 19, change "sinitered" to --sintered--.

Signed and Sealed this

Twenty-eighth Day of November 1989

*Attest:*

JEFFREY M. SAMUELS

*Attesting Officer*     *Acting Commissioner of Patents and Trademarks*